US012561379B2

(12) United States Patent
Fan et al.

(10) Patent No.: US 12,561,379 B2
(45) Date of Patent: Feb. 24, 2026

(54) WEB TRANSFORMERS

(71) Applicant: Microsoft Technology Licensing, LLC, Redmond, WA (US)

(72) Inventors: Xiaodong Fan, Bellevue, WA (US); Elbio Renato Torres Abib, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/649,400

(22) Filed: Apr. 29, 2024

(65) Prior Publication Data
US 2025/0335513 A1 Oct. 30, 2025

(51) Int. Cl.
*G06F 16/00* (2019.01)
*G06F 16/9032* (2019.01)
*G06F 16/908* (2019.01)
*G06F 16/955* (2019.01)

(52) U.S. Cl.
CPC ...... *G06F 16/908* (2019.01); *G06F 16/90332* (2019.01); *G06F 16/955* (2019.01)

(58) Field of Classification Search
CPC . G06F 16/908; G06F 16/90332; G06F 16/955
See application file for complete search history.

(56) References Cited

U.S. PATENT DOCUMENTS 10,768,977 B1 * 9/2020 Paul ........................ H04L 67/34
10,963,525 B2 * 3/2021 Nishant .................. G06N 3/006

11,106,683 B2 8/2021 Kumar
11,263,249 B2 3/2022 Layton
2018/0103004 A1 * 4/2018 Demir ..................... H04L 51/52
2018/0296929 A1 * 10/2018 Vaccari ................... H04L 51/02
2018/0376002 A1 * 12/2018 Abraham ............ H04M 3/5183
2019/0043106 A1 * 2/2019 Talmor .................. G06N 20/00
2019/0044829 A1 * 2/2019 Balzer ................... H04L 51/214
2019/0200064 A1 * 6/2019 Louis .................... G06F 16/951

(Continued)

FOREIGN PATENT DOCUMENTS

CN 116501843 A 7/2023
CN 116931928 A 10/2023

OTHER PUBLICATIONS

Clarke, et al., "One Agent to Rule Them All: Towards Multi-agent Conversational AI", arXiv:2203.07665 v1, Mar. 15, 2022, 10 Pages.

(Continued)

*Primary Examiner* — Noosha Arjomandi

(57) ABSTRACT

The technology described herein relates to resource-efficient systems and methods for providing customized chatbot functionality through a web browser, without requiring each entity to separately host, train, and/or configure its own generative AI model. More specifically, custom AI metadata is included in the data package for a web resource. The custom AI metadata is extracted and used to enable customized chatbot features. The web browser identifies the custom AI metadata and uses the metadata to configure a generative AI model that supports chatbot functionality within the web browser. As a result, entities that provide webpages can customize AI-based chatbot functionality by including the custom AI metadata within the HTML content of the webpages.

20 Claims, 7 Drawing Sheets

(56)    References Cited

U.S. PATENT DOCUMENTS

| | | | |
|---|---|---|---|
| 2020/0005118 A1* | 1/2020 | Chen ........................ | G06N 3/084 |
| 2020/0349215 A1* | 11/2020 | McMurray ............ | G06F 16/955 |
| 2023/0134149 A1* | 5/2023 | Zhong ...................... | G06N 5/04 |
| | | | 704/9 |
| 2023/0244506 A1 | 8/2023 | Geller | |
| 2024/0061835 A1* | 2/2024 | Subramanian ........ | G06F 16/252 |

OTHER PUBLICATIONS

International Search Report and Written Opinion received for PCT Application No. PCT/US2025/015164, Mar. 28, 2025, 15 pages.
"Anywebsite", accessed on link https://deepgram.com/ai-apps/anywebsite, retrieved on Dec. 26, 2023, 7 pages.
"WebChatGPT: ChatGPT with internet access", accessed on link https://chromewebstore.google.com/detail/webchatgpt-chatgpt-with-i/lpfemeioodjbpieminkklglpmhIngfcn, retrieved on Dec. 26, 2023, 3 pages.
Nakano, et al., "WebGPT: Browser-assisted question-answering with human feedback", accessed on link https://arxiv.org/pdf/2112.09332.pdf, Jun. 1, 2022, 32 pages.
Ubah, "How to Create a Chatbot With the ChatGPT API", accessed on link https://www.freecodecamp.org/news/how-to-create-a-chatbot-with-the-chatgpt-api/ , Jul. 26, 2023, 15 pages.

* cited by examiner

100

LANGUAGE MODEL 108

WEB SERVERS 110

105

COMPUTING DEVICE 102

WEB BROWSER 112

114

104

106

200

WEB SERVER(S) 110

LANGUAGE MODEL 108

PAGE REQUEST 203

HTML PACKAGE 205

PROMPT 217

OUTPUT PAYLOAD 219

WEB BROWSER 112

BROWSING FUNCTIONS 202

PAGE DATA 207

AI DATA 209

PROMPT GENERATOR 204

CONV. CONTEXT 215

INPUT QUERY 211

CHAT INTERFACE 206

PAGE COMMANDS 221

NAVIGATION INPUT 201

INPUT QUERY 211

RESPONSE 213

400

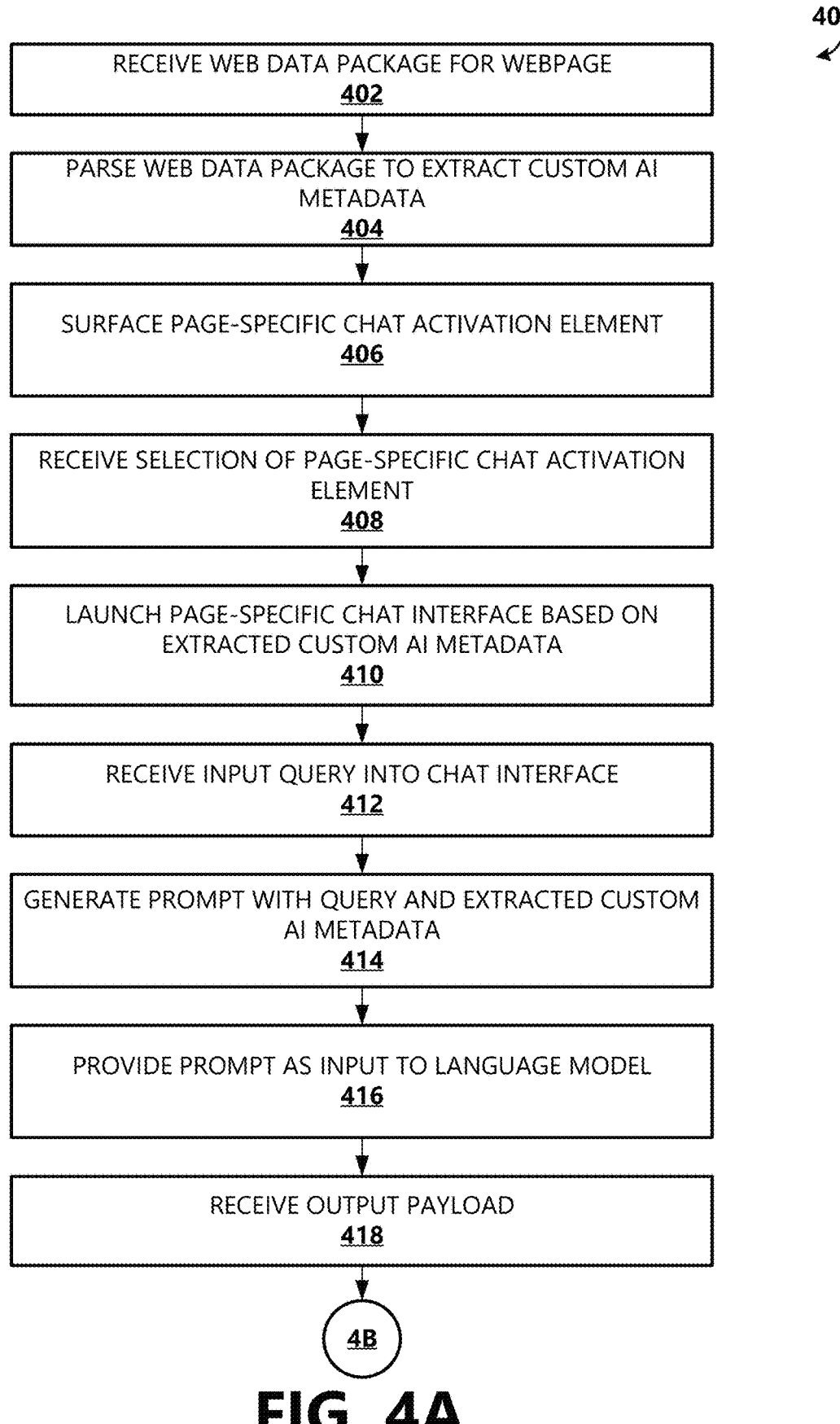

RECEIVE WEB DATA PACKAGE FOR WEBPAGE
402

PARSE WEB DATA PACKAGE TO EXTRACT CUSTOM AI METADATA
404

SURFACE PAGE-SPECIFIC CHAT ACTIVATION ELEMENT
406

RECEIVE SELECTION OF PAGE-SPECIFIC CHAT ACTIVATION ELEMENT
408

LAUNCH PAGE-SPECIFIC CHAT INTERFACE BASED ON EXTRACTED CUSTOM AI METADATA
410

RECEIVE INPUT QUERY INTO CHAT INTERFACE
412

GENERATE PROMPT WITH QUERY AND EXTRACTED CUSTOM AI METADATA
414

PROVIDE PROMPT AS INPUT TO LANGUAGE MODEL
416

RECEIVE OUTPUT PAYLOAD
418

SURFACE RESPONSE IN CHAT INTERFACE
420

EXECUTE BROWSER COMMAND IN OUTPUT PAYLOAD
422

RECEIVE SECOND WEB DATA PACKAGE FOR SECOND
WEBPAGE
424

GENERATE SECOND PROMPT WITH DATA FROM SECOND
WEB DATA PACKAGE
426

PROVIDE SECOND PROMPT TO LANGUAGE MODEL
428

RECEIVE SECOND OUTPUT PAYLOAD FROM LANGUAGE
MODEL
430

500

WEB TRANSFORMERS

BACKGROUND

Interactions with generative artificial intelligence (AI) models may often occur in a chat-based format. For instance, natural language inputs are provided to a chat interface. Those natural language inputs are combined into a prompt that is provided to the AI model to process. The output of the AI model is then provided as a response to the natural language inputs. These input/output pairs may continue for several turns as part of a thread or pseudo-conversation with the AI model.

It is with respect to these limitations and other considerations that examples have been made. In addition, although relatively specific problems have been discussed, it should be understood that the examples should not be limited to solving the specific problems identified in the background.

SUMMARY

The technology described herein, among other things, relates to resource-efficient systems and methods for providing customized chatbot functionality through a web browser, without requiring each entity to separately host, train, and/or configure its own generative AI model. More specifically, custom AI metadata is included in the data package (e.g., HyperText Markup Language (HTML)) for a web resource (e.g., webpage). The custom AI metadata is extracted and used to enable customized chatbot features. The web browser identifies the custom AI metadata and uses the metadata to configure a generative AI model that supports chatbot functionality within the web browser. As a result, entities that provide webpages can customize AI-based chatbot functionality by including the custom AI metadata within the HTML content of the webpages. For instance, the entity that creates the webpage may include custom AI metadata that describes how the chatbot should behave and additional knowledge that the chatbot may need to answer likely queries from a user visiting the webpage, such as the structure of the webpage or linked webpages of the website or domain of the webpage. Accordingly, different chatbot functionality may be provided for different webpages without the webpage entity having to directly configure, train, or host its own generative AI models.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

FIGS. 4A-4B depict example methods for implementing custom web transformer technology.

DETAILED DESCRIPTION

As discussed briefly above, interactions with generative AI models may occur through a chat-based interface where the generative AI model supports, or provides, the chatbot functionality. As part of the chat, an input or query is received (often from a user operating a user device) and a response is generated by the AI model that processes the input. Each input-output pair may be considered a single "turn." Multiple turns form a thread or conversation.

As the use of, and demand for, chatbots continues to grow, many entities are looking to provide their own specific chatbot to expose to end users. The creation of a custom chatbot, however, requires extensive computing resources to train, finetune, or otherwise configure the generative AI models that support the chat functionality. The entity may further be required to host the particular customized AI model on hardware that can serve the chat requests. In some examples, the customized AI models may be hosted on separate servers, but unique application programming interfaces (APIs) must then be used by the entity to provide the chat functionality. In any such implementations, significant computing resources must be utilized to provide the customizations.

The technology described herein, among other things, addresses the problems above by providing a resource-efficient manner for delivering customized chatbot functionality through a web browser without requiring each entity to separately host, train, and/or configure its own generative AI model. More specifically, custom AI metadata is included in the data package (e.g., HyperText Markup Language (HTML)) for a web resource (e.g., webpage) that is then used to enable customized chatbot features. The web browser identifies the custom AI metadata and uses the metadata to configure a generative AI model that supports chatbot functionality within the web browser. As a result, entities that provide webpages can customize AI-based chatbot functionality by simply including data within the HTML content of the webpages. For instance, the entity that creates the webpage may include custom AI metadata that describes how the chatbot should behave and/or additional knowledge that the chatbot may need to answer likely queries from a user visiting the webpage, such as the structure of the webpage or linked webpages of the entity or domain of the webpage. Accordingly, different chatbot functionality may be provided for different webpages without the webpage entity having to directly configure, train, or host its own generative AI models.

Figure 1:
FIG. 1 depicts a block diagram of a system in which a custom web transformer system is implemented according to an example.
Figure 5:
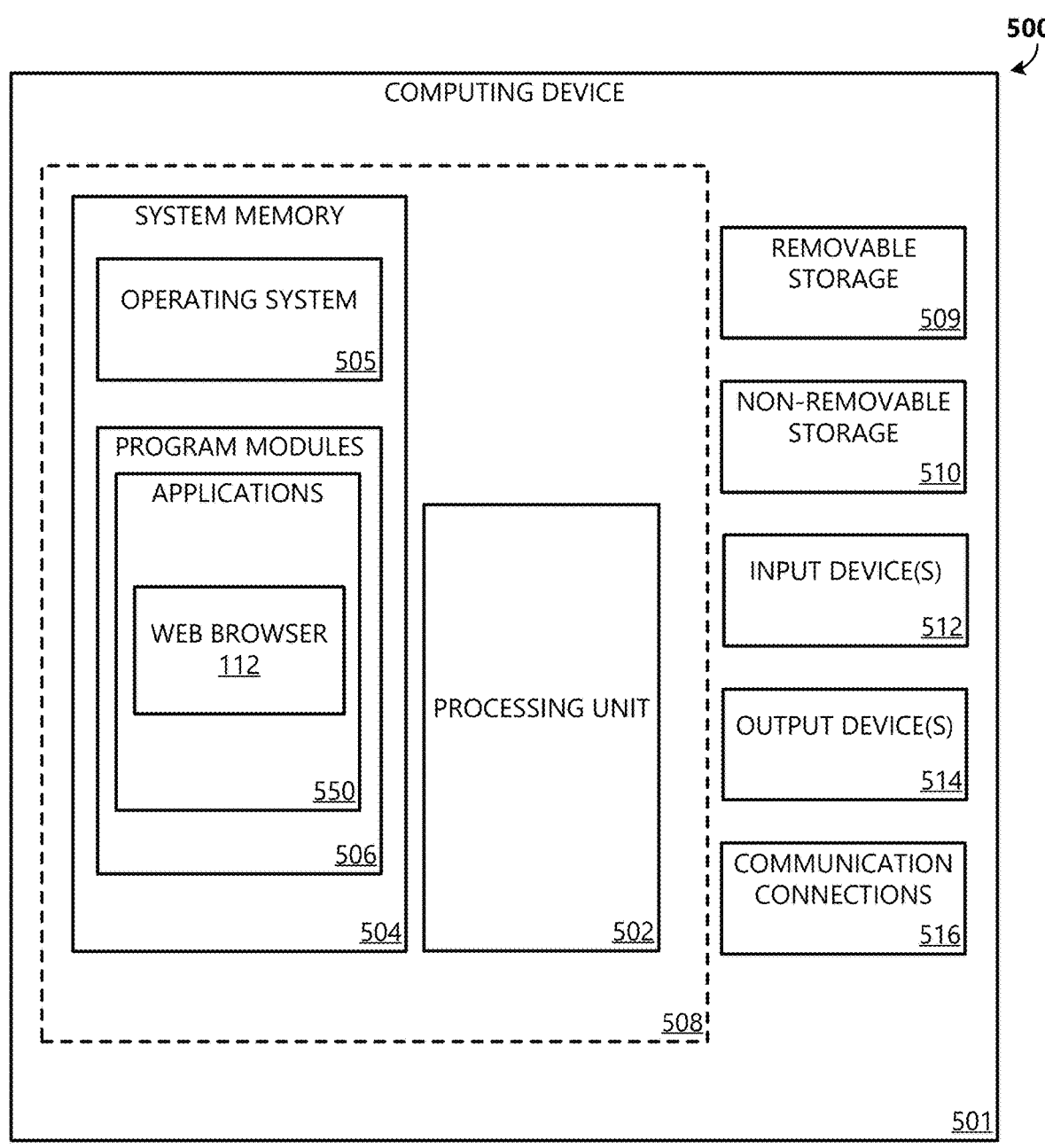
FIG. 5 is a block diagram illustrating example physical components of a computing device with which aspects of the disclosure may be practiced.

FIG. 1 is a block diagram of an example system 100 for generating a dynamic thread descriptor in accordance with an example. The example system 100, as depicted, is a combination of interdependent components that interact to form an integrated whole. Some components of the system 100 are illustrative of software applications, systems, or modules that operate on a computing device or across a plurality of computer devices. Any suitable computer device(s) may be used, including web servers, application servers, network appliances, dedicated computer hardware devices, virtual server devices, personal computers, a system-on-a-chip (SOC), or any combination of these and/or other computing devices known in the art. In one example, components of systems disclosed herein are implemented on a single processing device. The processing device may provide an operating environment for software components to execute and utilize resources or facilities of such a system. An example of processing device(s) comprising such an operating environment is depicted in FIG. 5. In another example, the components of systems disclosed herein are distributed across multiple processing devices. For instance, an input may be entered on a user device or client device and information may be processed on or accessed from other devices in a network, such as one or more remote cloud devices or web server devices.

The example system includes a computing device 102. The computing device 102 may take a variety of forms, including, for example, desktop computers, laptops, tablets, smart phones, wearable devices, gaming devices/platforms, virtualized reality devices/platforms (e.g., virtual reality (VR), augmented reality (AR), mixed reality (MR)), etc. The computing device 102 has an operating system that provides a graphical user interface (GUI) that allows users to interact with the computing device 102 via graphical elements, such as application windows (e.g., display areas), buttons, icons, and the like. For example, the graphical elements are displayed on a display screen 104 of the computing device 102 and can be selected and manipulated via user inputs received via a variety of input device types (e.g., keyboard, mouse, stylus, touch, spoken commands, gesture).

The computing device 102 includes a display 104 that generates a UI 106 according to a web browser 112 operating on the computing device. The UI 106 may include at least one input field 114 for receiving input from the user.

In examples, the computing device 102 includes a plurality of applications for performing different tasks, such as communicating, information generation and/or management, data manipulation, visual construction, resource coordination, calculations, etc. According to an example implementation, the applications include at least one web browser 112. In examples, the web browser 112 supports a chat feature that allows a user to interact with a chatbot, such as the BING CHAT interface or the COPILOT interface from Microsoft, through a chat agent interface. The chatbot may interact with a user through various communication means such as text or voice. For instance, an input field 114 of the chat interface is presented via the UI 106. The input field 114 receives inputs for the chat feature, as discussed further below. The inputs may be received in the form of various modalities, such as text, image, and/or audio.

The computing device 102 is in communication with a language model 108 and web servers 110 that host various web resources, such as webpages. The computing device 102 communicates with the language model 108 and the web servers 110 via a network 105. For instance, the computing device 102 may communicate with the language model 108 and web servers 110 using one or a combination of networks 105 (e.g., a private area network (PAN), a local area network (LAN), a wide area network (WAN), Internet). In some examples, the language model 108 is implemented in a cloud-based environment or server-based environment using one or more cloud resources, such as server devices (e.g., web servers, file servers, application servers, database servers), personal computers (PCs), virtual devices, and mobile devices. The hardware of the cloud resources may be distributed across disparate regions in different geographic locations.

The language model 108 may be a generative AI model, such as a large language model (LLM), a multimodal model, or other types of generative AI models. Example models may include the GPT models from OpenAI, BARD from Google, and/or LLAMA from Meta, among other types of generative AI models. Some small language models (SLMs) may also be used, such as the Phi-2 or Phi-3 models from Microsoft. The language model 108 may support the chat features discussed herein.

According to example implementations, the language model 108 is trained to understand and generate sequences of tokens, which may be in the form of natural language (e.g., human-like text). In various examples, the language model 108 can understand complex intent, cause and effect, perform language translation, semantic search classification, complex classification, text sentiment, summarization, summarization for an audience, and/or other natural language capabilities.

In some examples, the language model 108 is in the form of a deep neural network that utilizes a transformer architecture to process the text it receives as an input or query. The neural network may include an input layer, multiple hidden layers, and an output layer. The hidden layers typically include attention mechanisms that allow the language model 108 to focus on specific parts of an input, and to generate context-aware outputs. Language model 108 is generally trained using supervised learning based on large amounts of annotated text data and learns to predict the next word or the label of a given text sequence.

The size of a language model 108 may be measured by the number of parameters it has. For instance, as one example of an LLM, the GPT-4 model from OpenAI has billions of parameters. These parameters may be weights in the neural network that define its behavior, and a large number of parameters allows the model to capture complex patterns in the training data. The training process typically involves updating these weights using gradient descent algorithms, and is computationally intensive, requiring large amounts of computational resources and a considerable amount of time. The language model 108 in examples herein, however, is pre-trained, meaning that the language model 108 has already been trained on the large amount of data. This pre-training allows the model to have a strong understanding of the structure and meaning of an input, which makes it more effective for the specific tasks discussed herein.

The language model 108 may operate as a transformer-type neural network. Such an architecture may employ an encoder-decoder structure and self-attention mechanisms to process the input (e.g., the text, image description or contextual history). Initial processing of the input data may include tokenizing the input into tokens that may then be mapped to a unique integer or mathematical representation. The integers or mathematical representations combined into vectors that may have a fixed size. These vectors may also be known as embeddings.

The initial layer of the transformer model receives the token embeddings. Each of the subsequent layers in the model may use a self-attention mechanism that allows the model to weigh the importance of each token in relation to every other token in the input. In other words, the self-attention mechanism may compute a score for each token pair, which signifies how much attention should be given to other tokens when encoding a particular token. These scores are then used to create a weighted combination of the input embeddings.

In some examples, each layer of the transformer model comprises two primary sub-layers: the self-attention sub-layer and a feed-forward neural network sub-layer. The self-attention mechanism mentioned above is applied first, followed by the feed-forward neural network. The feed-forward neural network may be the same for each position and apply a simple neural network to each of the attention output vectors. The output of one layer becomes the input to the next. This means that each layer incrementally builds upon the understanding and processing of the data made by the previous layers. The output of the final layer may be processed and passed through a linear layer and a softmax activation function. This outputs a probability distribution over all possible tokens in the model's vocabulary. The token(s) with the highest probability is selected as the output token(s) for the corresponding input token(s). While the model 108 is generally described as a "language model," the language model 1018 may be capable of processing multiple modalities in addition to text, such as images, videos, audio, and/or gestures, among other modalities.

The web servers 110 receive requests for web resources (e.g., webpages) and return the requested resources. The webpages include data packages, such as HTML packages, that include traditional webpage data for display in the web browser. The web data packages also include custom AI (e.g. transformer) metadata that is used to customize the AI-based chat features discussed herein. The transformer metadata is generally not surfaced to the user through the main window of the browser. Rather, the transformer metadata is incorporated into an AI prompt that is used to instruct and/or prime the language model 108 to provide chat responses that are customized to the particular webpage, as discussed further herein.

Figure 2:
FIG. 2 depicts a block diagram of example components of a custom web transformer system.

FIG. 2 is a block diagram of example components for a web transformer system 200. System 200 includes the web browser 112, web servers 110, and the language model 108 of FIG. 1. In the example depicted, the web browser 112 includes several subcomponents, including browsing functions 202, a prompt generator 204, and a chat interface 206.

The browsing functions 202 of the web browser 112 support the traditional features of the web browser 112, such as navigating to different webpages using web addresses, such as uniform resource locators (URLs). The browsing functions 202 may also perform extraction functions, such as extracting custom AI metadata from HTML packages that are received.

As an example, the web browser 112 receives a navigation input 201, such as from a user, to navigate to a particular webpage. The browsing functions 202 generate a webpage request 203, which requests the webpage indicated in the navigation input 201. The webpage request 203 is then transmitted to the web address for the webpage. The webpage request 203 is received by a web server 110 for the webpage, which processes the webpage request 203. The web server 110 then returns web-data package 205, which includes data for the webpage, to the web browser 112. In the example discussed herein, the web-data package is an HTML package 205.

The HTML package 205 includes the traditional webpage data, such as the content that is to be displayed by the web browser 112 to the user. The HTML package 205 also includes the custom AI metadata of the technology discussed herein. The browsing functions 202 may parse the HTML package 205 to identify the custom AI metadata within the HTML package 205.

The custom AI metadata 209 may include different elements that can ultimately be provided to the language model 108 to adjust how the language model 108 processes received queries and generates the corresponding responses. For example, the custom AI metadata 209 may provide a structure for properly executing a query against the webpage, website, or domain. For instance, the unique URL structure for the webpage or website may be provided that can be used to execute a query. As one example, for a website "ElbioAir.com," the following custom AI metadata 209 may be provided that provides additional guidance regarding forming queries:

"If you need to search for flights, this is the URL: elbioair.com/startdate=<date>&EndDate=<date>& startairport=<airport_code>&endairport=<airport_code>"

The above URL information provides instructions for the language model 108 on how to form a search query for the website. For instance, the structured URL data includes one or more query terms (or placeholders therefore). Accordingly, the response generated from the language model 108 may include such a structured URL based on input data from an input query from the user. This particular URL example is discussed in further detail below with reference to FIG. 3B.

The custom AI metadata 209 may also include information about how the displayed webpage content should be semantically parsed. For instance, traditionally, parsing of a webpage includes treating the webpage content roughly as unstructured data. Structure of the data is then be inferred from natural language analysis of the content provided within the webpage. With the custom AI metadata 209 provided herein, the web developer can directly identify different structures and/or purposes of different sections of the webpage, which provides more direct and likely more accurate information about the webpage itself (as opposed to solely inferences from natural language processing). As one specific example, completing a transaction via a webpage often requires the filling of forms or data in a structured manner. The webpage owner is now able to provide the specific structure of such forms via the custom AI metadata 209 to allow for task-completion assistance from the language model 108. The resultant commands and responses that are generated are thus more accurate for the specific webpage.

Additional task-completion benefits may also be provided through the custom AI metadata 209. For instance, the custom AI metadata 209 may provide a list of supported actions that can be handled by the particular webpage or website to which the webpage belongs. The supported actions may also include the individual web addresses for the webpages that support the particular action. Additional data about the structure of each of those additional data may be further included. The inclusion of such data avoids the need for the web browser and/or the language model 108 to have to traverse all the pages of the website and make inferences about what actions may be supported by each webpage within the domain. As a result, AI-assisted task completion becomes more accurate and computationally efficient.

As one example, continuing with the ElbioAir example above, the ElbioAir website may be a travel website. The custom AI metadata 209 may indicate some of the tasks or actions that are supported by the website, which may include travel booking, change of travel, checking into a flight, etc. Each of these actions include a corresponding web address for the webpage that supports the particular action. The structure of each of those webpages may also be indicated to allow for the language model 108 to generate commands or responses that are more accurate to the specific webpage.

The actions that are listed may range from higher-level tasks to lower-level operations. For instance, one challenge in AI-assisted task completion is the determination of the discrete operations that need to be performed in order to complete the task (e.g., a list of ordered operations). The web developer for the website is best positioned to know and understand that list of ordered operations for completing each supported task. Accordingly, for each supported task that is listed in the custom AI metadata 209, a discrete set of ordered operations may be provided for completing the task. The operations may include particular webpages that should be navigated to, query-based URLs that should be entered, and/or fields that should be filled, among other operations. The custom AI metadata 209 may also include data about how the results from each operation should be interpreted. For instance, the web developer again knows the structure and meaning for the results that are generated from each of the discrete operations. That information can be conveyed with the list of operations in the custom AI metadata 209 to provide guidance to the language model 108 for how to interpret the results. The language model 108 is then able to use the results of the operation and the custom AI metadata 209 to generate an output (e.g., commands) to complete the next operation in the sequence based on the results from the prior operation.

Additionally or alternatively, the custom AI metadata 209 may include data about how the language model 108 should interpret the content of the webpage and/or how responses should be formed. For instance, the custom AI metadata 209 may include subject-matter domain data for the webpage, which may provide insights into the intended audience for the webpage. As one example, a webpage may be a page about optical lasers and their operations. The custom AI metadata 209 may provide data indicating that this is a webpage having a subject-matter domain of physics intended for students having a grade level between grades 8-10. Such data allows for the language model 108 to more accurately process the content of the webpage and generate responses that are appropriate for the intended audience. Without such custom AI metadata 209, the language model 108 may generate responses with content that is too advanced for the audience.

The preferred theme and/or tone of the generated responses may also be provided within the custom AI metadata 209. For instance, a casual tone and/or a professional tone may be provided and/or defined. An initial greeting message to be provided by the language model 108 may also be defined within the custom AI metadata 209. Further, icons or imagery for the chat interface may also be defined within the custom AI metadata 209. As a result, the web developer is given substantial control over the narrative and behaviors of the chat experience for visitors to the webpage.

The custom AI metadata 209 may also include data restrictions for the language model 108. For example, the custom AI metadata 209 may indicate that only data from the webpage or website may be used for generating responses to chat queries. In other examples, the custom AI metadata 209 may include a list of allowed data sources (e.g., websites/ webpages) and/or a list of disallowed data sources. Additional offers from the website (e.g., current sales, discounts) that are available may also be included in the custom AI metadata 209 and used in generating responses.

For each of the types of data that can be included as the custom AI metadata 209, examples for each type may be included within the custom AI metadata 209 as well. For instance, with the ElbioAir search example discussed above, the custom AI metadata 209 may include examples of input queries from a chat interface and the resultant search URL for each input query.

Once the custom AI metadata 209 is identified within the HTML package 205, the identified custom AI metadata 209 is provided to the prompt generator 204. The prompt generator 204 uses the custom AI metadata 209 to generate one or more AI prompts 217 that are provided as input the language model 108, as discussed further below. In some examples, the webpage data 207 (e.g., the content of the webpage that is displayed within the web browser 112) may also be provided to the prompt generator 204 to be used as additional context for generating the prompts 217.

Turning to the features of the chat interface 206, the chat interface 206 receives input queries 211, such as from a user into an input field of the chat interface 206. When an input query 211 is received, the input query 211 is then passed to the prompt generator 204 to be included in an input prompt 217 that is provided to the language model 108. When the language model 108 receives an input prompt 217, the language model 108 processes the prompt and generates a responsive output payload 219 that includes a response to the input query 211 and, in some examples, webpage commands 221 for interacting with the webpage that is displayed within the web browser 112. The webpage commands 221 may include commands to fill fields of the webpage and/or otherwise interact with the elements displayed in the webpage. The chat interface 206 parses the received output payload 219 to extract the response 213 and/or the webpage commands 221. The response 213 is then surfaced to the user in the chat interface 206.

Returning to the prompt generator 204, the prompt generator 204 forms AI prompts based on the inputs that are received (e.g., the custom AI metadata 209, the webpage data 207, the input query 211, and/or the conversation context 215) and, in some examples, a prompt template. For example, a prompt template may be configured with static instructions and dynamic placeholders that are populated with one or more of the inputs that are received by the prompt generator 204 to form an AI prompt 217.

In some examples, to customize the behavior of the language model 108 supporting particular chat session, the prompt generator 204 generates a priming prompt that is configured to prime the language model 108 for subsequent queries. The priming prompt includes the custom AI metadata 209 that was received in the HTML package 205. The priming prompt also includes static instructions that further detail what the custom AI metadata 209 is and/or how the language model 108 should use the custom AI metadata 209. For example, the static instructions may include example phrases such as "The following information provides directions for how you are supposed to behave and respond to input queries that are received. The information further provides additional resources and structural data about the webpage's capabilities and features. Such features should be considered in generating responses to input queries." The custom AI metadata 209 is then incorporated into the priming prompt following such static instructions (e.g., by filling a dynamic placeholder for the custom AI metadata). The priming prompt is then provided to the language model 108 as an input prompt 217, which causes the language model 108 to process the priming prompt and adjust is processing of future queries according to the custom AI metadata 209. For instance, through few-shot learning principles, the language model 108 is able to more accurately provide responses based on the custom AI metadata 209 in the priming prompt. The language model 108 itself, however, remains fundamentally unaltered.

When an input query 211 is then received by the chat interface 206, the input query 211 is passed to the prompt generator 204. The prompt generator 204 forms a prompt that includes the input query 211. In some examples, the prompt that is formed also includes one or more portions of the priming prompt discussed above (e.g., the custom AI metadata 209 and the static instructions). The prompt may also include the webpage data 207 where such data has been provided to the chat interface 206. The formed prompt is then provided to the language model 108 as an input prompt 217. The language model 108 processes the input prompt 217 and generates an output payload 219 that includes a response 213 that is based on the input query 211 and the custom AI metadata 209. As a result, the response 213 appears to the user as if the response 213 was generated by fine-tuned or otherwise customized chatbot for the webpage—even though the webpage itself did not customize any language models supporting the chatbot functionality.

Figure 3A:
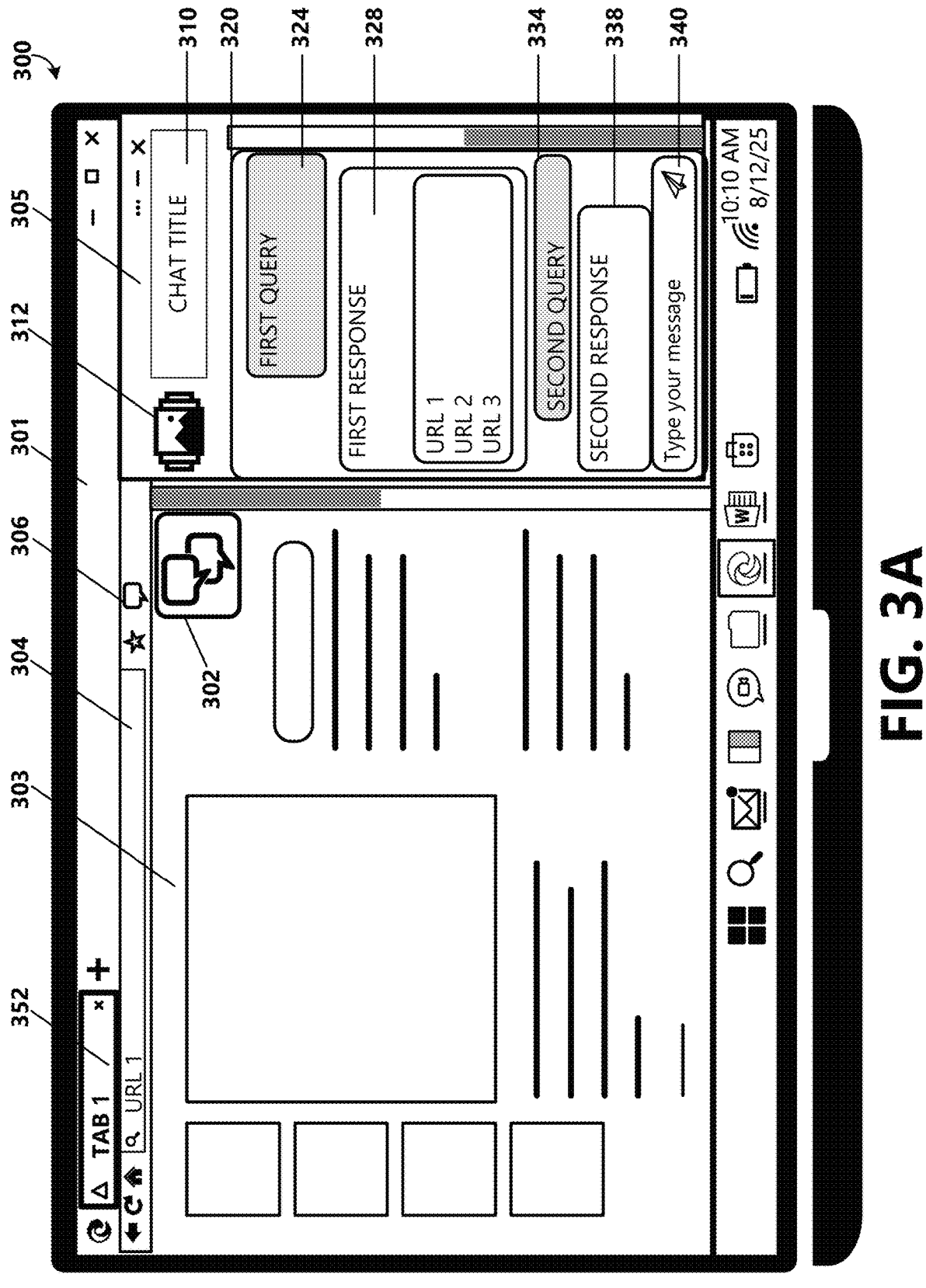
FIGS. 3A-3B depict an example interface implementing examples of the custom web transformer technology.

FIG. 3A depicts an example interface 300 for implemented custom web transformers. The example interface 300 includes a web browser 301 that includes a main window 303 and a side pane 305. The main window 303 of the web browser 301 displays webpages that have been retrieved by the web browser 301 from one or more web servers. For instance, when a web address (e.g., URL) is entered into an address bar 304, the resultant webpage is opened in a tab 352 of the web browser 301.

In the example depicted, the side pane 305 hosts a chat interface. The side pane 305 may be hosted by the web browser 301, the operating system of the device, and/or another application of the device. The side pane 305 has been populated with the data from an ongoing chat. The side pane 305 further includes a query/response section 320 that displays the prior queries and corresponding generated responses from the language model. For instance, the query/response section 320 includes a first query 324, a first response 328, a second query 334, and a second response 338. A query-input element 340 (e.g., input field) that receives new queries from the user is also presented in the chat interface of the side pane 305. While this example depicts the chat interface within the side pane 305, the chat interface may be launched in different panes or locations of the web browser web browser 301 and/or within the content of the webpage itself.

As a simple example, the HTML data received in the webpage data may be similar to the following:

```
<!DOCTYPE html>
<html lang="en">
<head>
    <meta charset="UTF-8">
    <meta name="description" content="This is a simple example of an
HTML webpage with metadata tags.">
    <meta name="customai" content = [CUSTOM AI METADATA 209]
    <title>Simple HTML Page Example</title>
</head>
<body>
    <h1>Welcome to My Simple Webpage</h1>
    <p>This is an example of a simple HTML webpage. < /p>
</body>
</html>
```

In the above HTML data, the custom AI metadata 209 is included as metadata in the header. For instance, the custom AI metadata 209 is included in the metadata tag "customai". Other tags or names for the custom AI metadata 209 may also be used. In other examples, the custom AI metadata 209 may be included in the HTML data in other manners outside of the header. For instance, the custom AI metadata 209 may be included in the body of the webpage and configured to have a text color that matches the background of the webpage, thus rendering it invisible to the user viewing the page, but detectable within the HTML package.

Parsing the HTML data may thus include detecting the unique tag for the custom AI metadata 209 and then extracting the custom AI metadata 209 for the data in the section following the identified tag. The extracted custom AI metadata 209 may then be used to form the prompts that are provided to the language model 108, as discussed further herein.

Actions may also be performed by the web browser 301 based on whether the custom AI metadata 209 is detected within the HTML or not. For example, when the presence of the custom AI metadata 209 is detected, a page-specific chat activation UI element 302 is displayed by the web browser 301. The page-specific chat activation UI element 302 may be configured (e.g., size, location, image) by the web data package for the webpage and displayed within the webpage itself. In other examples, the web browser 301 may generate the page-specific chat activation UI element 302 and provide the page-specific chat activation UI element 302 as an overlay of the webpage content in the main window 303. In other examples, the page-specific chat activation UI element 302 may be displayed in a different portion of the web browser 301.

When the page-specific chat activation UI element 302 is selected, the chat interface is launched, and a custom experience is provided according to the custom AI metadata 209 in the web data package. For instance, the chat interface may be populated with a chat icon 312, which may be an image specified or defined in the custom AI metadata 209. The chat interface may also be populated with a chat title 310 as defined in the custom AI metadata 209.

The web browser 301 may also provide a different entry point into the chat interface via a generic chat activation UI element 306. When the generic chat activation UI element 306 is selected, the chat interface is launched, but the chat interface is not customized by any custom AI metadata 209 that may have been included in the web data package. For instance, the chat title 310 and the chat icon 312 are not specific to the webpage being viewed. Rather, the chat title 310 and the chat icon 312 may be based on the web browser instead. The generic chat activation UI element 306 may be included in a toolbar, such as the address bar 304, of the web browser instead of being displayed within or as an overlay of the webpage. The generic chat activation UI element 306 also may remain consistent even when different webpages are being viewed.

Accordingly, the type of chat interface, and the resultant responses, may be different based on how the chat interface was launched (e.g., via the page-specific chat activation UI element 302 or the generic chat activation UI element 306). In an example, if the generic chat interface is currently being shown, the page-specific chat activation UI element 302 may be selected to convert to the page-specific chat interface, such as by replacing generic chat interface with the page-specific chat interface. Similarly, if the page-specific interface is being shown, the generic chat activation UI element 306 may be selected to convert to the generic chat interface, such as by replacing the page-specific chat interface with the generic chat interface. Such conversion changes not only how the chat interface is presented but also how the queries and processed and the responses are generated.

Figure 3B:
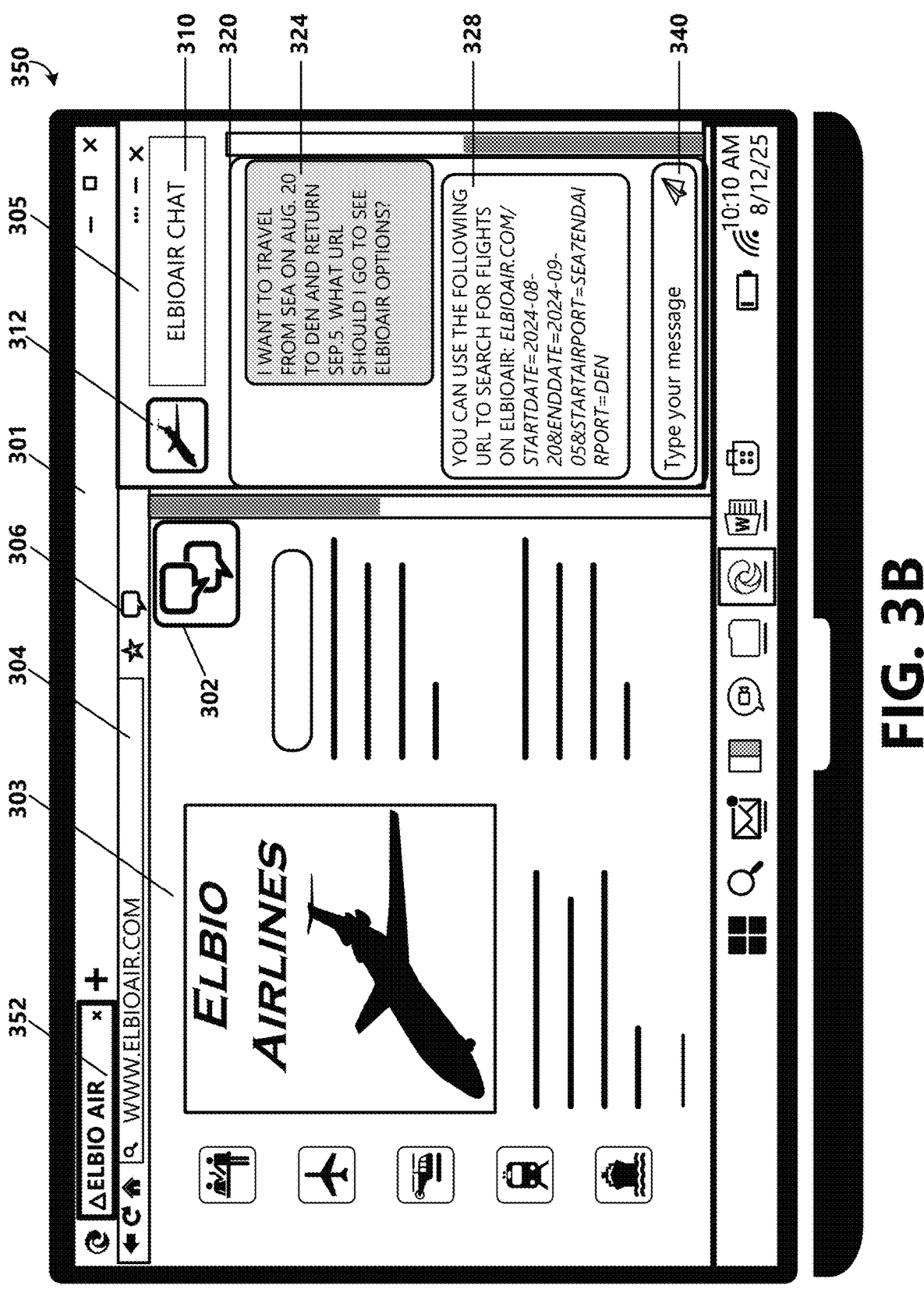

FIG. 3B depicts an example interface 350 for an example webpage of ElbioAir.com. The example interface 350 is substantially the same as interface 300, but in interface 350, the web browser 301 has retrieved. In this example, the content of the webpage of ElbioAir.com has been loaded into the main window 303.

The web data package for the webpage also included at least the following custom AI metadata 209: "if you need to search for flights, this is the URL: elbioair.com/startdate=<date>&EndDate=<date>&startairport=<airport_code>&endairport=<airport_code>." The custom AI metadata 209 also includes a specific icon to include as the chat icon 312 and the specific title for the chat interface (e.g., "ELBIOAIR CHAT").

Due to the presence of the custom AI metadata 209, the page-specific chat activation UI element 302 is displayed. Upon selection of the page-specific chat activation UI element 302, the page-specific chat interface is populated in the side pane 305. The page-specific chat interface includes the page-specific icon (e.g., airplane) as the chat icon 312 and the page-specific title as the chat title 310.

In the example depicted, a first query 324 is received and a first response 328 is generated and surfaced in the chat interface. The first query 324 is: "I want to travel from SEA on August 20 to DEN and return September 5. what URL should I go to see Elbioair options?" This first query 324 is then incorporated into an AI prompt along with the custom AI metadata 209, which in this example includes the search URL structure. The prompt is provided to the language model 108 for processing and generation of the first response 328. In this example, the language model 108 processes the prompt to generate a specific search URL for ElbioAir.com based on the details set forth in the first query 324.

The resultant response 328 is then "YOU CAN USE THE FOLLOWING URL TO SEARCH FOR FLIGHTS ON ELBIOAIR: ELBIOAIR.COM/STARTDATE=2024 Aug. 20&ENDDATE=2024-09-05&STARTAIRPORT=SEA7ENDAIRPORT=DEN." The URL that is included in the response is selectable, and upon selection, the URL is provided to the web browser 301. The web browser 301 then navigates to the page according to the URL. The resultant webpage includes flights meeting the criteria set forth in the first response 328.

Figure 4B:
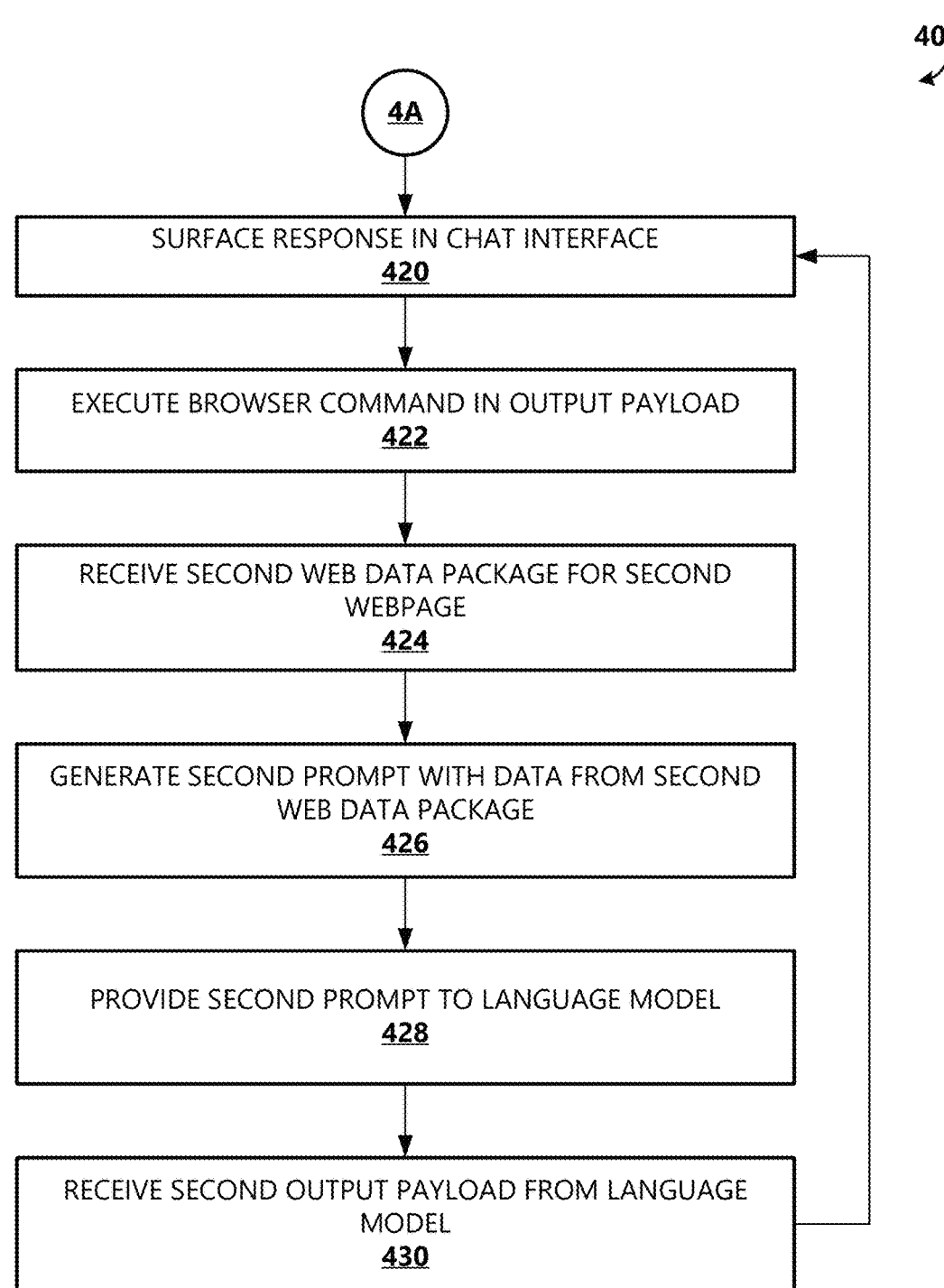

FIGS. 4A-4B depicts an example method 400 for implementing custom web transformers. At operation 402, a web data package is received for a webpage. For instance, when a web browser navigates to a particular web address, the web data package for the resultant webpage is received from the corresponding web server. The web data package may include markup language, such as HTML or extensible markup language (XML), among others. The web data package includes custom AI metadata, such as within the markup language for the webpage. The custom AI metadata may include any of the types of custom AI metadata discussed herein.

At operation 404, the web data package is parsed to extract the AI metadata. For instance, the HTML may be parsed to identify the unique metadata tag or name of the custom AI metadata. The corresponding data for the tag or name may then be extracted as the custom AI metadata.

At operation 406, based on the detection of the AI metadata, a page-specific chat activation UI element is surfaced in the web browser. For instance, the page-specific chat activation UI element may be surfaced within the content of the webpage and/or as an overlay of the webpage. The page-specific chat activation UI element may also be provided in a different portion of the web browser. The display characteristics (e.g., image, text) of the page-specific chat activation UI element 302 may be configured based on the custom AI metadata.

At operation 408, a selection of the page-specific chat activation UI element 302 is received. At operation 410, based on receiving the selection of the page-specific chat activation UI element 302, a page-specific chat interface is launched. For instance, the page-specific chat interface may be launched within a side pane of the web browser, and the chat interface may be displayed concurrently with the content of the webpage displayed in a main window of the web browser. The page-specific chat interface may be configured according to the custom AI metadata 209. For example, the chat title 310 and/or the chat icon 312 of the chat interface may be based on the custom AI metadata 209, which may define or specify such features.

At operation 412, an input query is received into the chat interface, such as via an input field of the chat interface. At operation 414, an AI prompt is generated with the input query and the extracted custom metadata. The AI prompt may also include static instructions for how to process the query based on the custom AI metadata. In some examples, the prompt also includes additional context from the webpage that is being displayed, such as the actual displayed content for the At operation 416, the generated prompt is provided as input to a language model (e.g., generative AI model). The language model processes the generated prompt to generate an output payload. The output payload is received by the web browser at operation 418.

The output payload may include a response to the input query to be surfaced in the chat interface and/or one or more web browser commands. At operation 420, the response is surfaced in the chat interface.

In examples where the output payload includes one or more browser commands, those operations are executed in operation 422. The web browser commands may include form-filling commands that cause the injection of data into one or more fillable fields of the webpage. The web browser commands may also include one or more navigation commands with web addresses. The navigation commands are provided to the web browser to cause the web browser to navigate to a second webpage within the website (or domain) of the first webpage.

In examples where a navigation command is executed, the web browser navigates to the second webpage and a second web data package for second webpage is received at operation 424. At operation 426, a second prompt is generated with data from the second web data package, such as custom AI metadata in the second web data package and/or content from the second webpage. The second prompt may also include additional context, such as prior queries, prior prompts, prior custom AI metadata, and/or prior responses.

At operation 428, the second prompt is provided as input to the language model. The language model processes the second prompt and generates a second output payload based on the data in the second prompt. The second output payload is received at operation 430. The method 400 then flows back to operation 420 where the remainder of the method 400 may be repeated by surfacing responses and/or executing additional commands that are generated in the output payloads.

In some examples, operations 422-430 are performed based on a sequence of operations for task completion that are provided in the custom AI metadata for the first webpage extracted in operation 404. For example, the input query may include a request that can be accomplished by a listed task in the custom AI metadata. The custom AI metadata may identify a sequence of commands to complete the task. The language model generates an output including a first command in the sequence. Upon the first command being completed and the responsive data (e.g., second webpage data) being received by the language model, the language model then generates an output including the second command in the sequence. This process may continue until all the commands in the sequence are complete-thus completing the task provided in the custom AI metadata.

In addition, the method 400 may be performed for new webpages that are navigated to by the web browser. For instance, when the new webpage is loaded and the custom AI metadata is extracted, a new page-specific chat interface may be provided, and the new responses generated to any new queries are based on the custom AI metadata of the new webpage.

While the techniques and procedures in methods depicted in FIGS. 4A-4B are depicted and/or described in a certain order for purposes of illustration, it should be appreciated that certain procedures may be reordered and/or omitted within the scope of various embodiments. The operations of the method described therein may also be performed by one or more components of systems 100 or 200 described above, such as the web browser, among other types of computing devices.

FIG. 5 is a block diagram illustrating physical components (e.g., hardware) of a computing device 501 with which examples of the present disclosure may be practiced. The computing device components described below may be suitable for one or more of the components of the systems 100, 200 described above. In a basic configuration, the computing device 501 includes at least one processing unit 502 and a system memory 504. Depending on the configuration and type of computing device 501, the system memory 504 may comprise volatile storage (e.g., random access memory), non-volatile storage (e.g., read-only memory), flash memory, or any combination of such memories. The system memory 504 may include an operating system 505 and one or more program modules 506 suitable for running software applications 550 (e.g., web browser 112) and other applications.

The operating system 505 may be suitable for controlling the operation of the computing device 501. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 501 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including one or more of the operations of the methods and processes discussed herein, such the methods of FIGS. 4A-4B. Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to detecting an unstable resource may be operated via application-specific logic integrated with other components of the computing device 501 on the single integrated circuit (chip). Examples of the present disclosure may also be practiced using other technologies capable of performing logical operations such as, for example, AND, OR, and NOT, including mechanical, optical, fluidic, and quantum technologies.

The computing device 501 may also have one or more input device(s) 512 such as a keyboard, a mouse, a pen, a sound input device, a touch input device, a camera, etc. The output device(s) 514 such as a display, speakers, a printer, etc. may also be included. The aforementioned devices are examples and others may be used. The computing device 501 may include one or more communication connections 516 allowing communications with other computing devices 518. Examples of suitable communication connections 516 include RF transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 504, the removable storage device 509, and the non-removable storage device 510 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 501. Any such computer readable media may be part of the computing device 501. Computer readable media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

In an aspect, the technology relates to a system for implementing custom web transformers. The system includes at least one processor; and memory storing instructions that, when executed by the at least one processor, cause the system to perform operations. The operations include receiving, by a web browser from a web server, a web data package for a webpage; parsing the web data package to extract custom artificial intelligence (AI) metadata from the web data package; launching a page-specific chat interface based on the custom AI metadata; receiving, in a chat interface, an input query; generating a prompt including the custom AI metadata and the input query; providing the prompt to a language model; receiving, in response to the prompt, an output payload from the language mode, the output payload including a response to the input query; and surfacing, in the chat interface, the response from the output payload.

In an example, the operations further include based on detecting a presence of the custom AI metadata in the web data package, surfacing a page-specific chat activation user-interface (UI) element; and receiving a selection of the page-specific chat activation UI element, wherein the page-specific chat interface is launched in response to receiving the selection. In another example, the operations further include surfacing a generic chat activation UI element; receiving a selection of the generic chat activation UI element; and in response to receiving the selection of the generic chat activation UI element, replacing the page-specific chat interface with a generic chat interface. In still another example, the page-specific chat interface includes at least one of a chat title or a chat icon that is specified in the custom AI metadata. In yet another example, the content for the webpage is surfaced in a main window of the web browser, and the page-specific chat interface is concurrently surfaced in a side pane of the web browser. In still yet another example, the custom AI metadata includes structure data for executing a query against at least one of the webpage or a website to which the webpage belongs. In a further example, the structure data includes a structured uniform resource locator (URL) including query terms.

In another example, the custom AI metadata includes structure data for semantic parsing of the webpage. In another example, the custom AI metadata includes one or more tasks that are capable of being completed by at least one of the webpage or a website to which the webpage belongs. In a further example, one or more of the tasks further includes a web address for completing the tasks. In another further example, one or more of the tasks further includes a sequence of actions to be performed to complete the tasks. In yet a further example, the output payload includes at least one web browser command for completing an action in the sequence of actions. In a still further example, the web browser command is one of a navigation command or a form-filling command. In yet another example, the custom AI metadata includes subject-matter domain data for the webpage. In still another example, parsing the web data package includes identifying a unique tag within HyperText Markup Language (HTML) that identifies the custom AI metadata.

In another aspect, the technology relates to a system for implementing custom web transformers. The system includes at least one processor; and memory storing instructions that, when executed by the at least one processor, cause the system to perform operations. The operations include surfacing, in a toolbar of a web browser, a generic chat activation UI element; receiving a selection of the generic chat activation UI element; in response to the selection of the generic chat activation UI element, launching a generic chat interface; receiving, by the web browser from a web server, a web data package for a webpage; parsing the web data package to extract custom artificial intelligence (AI) meta-data from the web data package; and based on a presence of the custom AI metadata, replacing the generic chat interface with a page-specific chat interface, wherein the page-specific chat interface includes one or more UI elements specified in the custom AI metadata.

In an example, the operations further include receiving, in the page-specific chat interface, an input query; generating a prompt including the custom AI metadata and the input query; providing the prompt to a language model; receiving, in response to the prompt, an output payload from the language model including a response to the input query; and surfacing, in the page-specific chat interface, the response. In a further example, the custom AI metadata specifies at least one of a chat title or a chat icon for the page-specific chat interface.

In another aspect, the technology relates to a computer-implemented method for implementing custom web transformers. The method includes receiving, by a web browser from a web server, a web data package for a webpage; parsing the web data package to extract custom artificial intelligence (AI) metadata from the web data package; launching a page-specific chat interface based on the custom AI metadata concurrently with a display of at least a portion of the webpage; receiving, in the page-specific chat interface, an input query; generating a prompt including the custom AI metadata and the input query; providing the prompt to a language model; receiving, in response to the prompt, an output payload from the language mode, the output payload including a response to the input query and a web browser command; surfacing, in the page-specific chat interface, the response in the output payload; and executing the web browser command. In an example, the web browser command is one of a navigation command or a form filling command.

It is to be understood that the methods, modules, and components depicted herein are merely examples. Alternatively, or in addition, the functionality described herein can be performed, at least in part, by one or more hardware logic components. For example, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Illustrative non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with, transmission media. Transmission media is used for transferring data and/or instruction to or from a machine. Examples of transmission media include coaxial cables, fiber-optic cables, copper wires, and wireless media, such as radio waves.

Furthermore, those skilled in the art will recognize that boundaries between the functionality of the above-described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system for implementing custom web transformers, comprising:

at least one processor; and memory storing instructions that, when executed by the at least one processor, cause the system to perform operations comprising:

receiving, by a web browser from a web server, a web data package for a webpage, wherein the web data package includes a markup language for the webpage that specifies how the webpage is displayed in the web browser and further includes custom artificial intelligence (AI) metadata;

parsing the web data package to extract the custom AI metadata from the web data package;

launching a page-specific chat interface that is customized for the webpage based on the custom AI metadata;

receiving, in a chat interface, an input query;

generating a prompt including the custom AI metadata and the input query;

providing the prompt to a language model;

receiving, in response to the prompt, an output payload from the language model, the output payload including a response to the input query; and surfacing, in the chat interface, the response from the output payload.

2. The system of claim 1, wherein the operations further comprise:

based on detecting a presence of the custom AI metadata in the web data package, surfacing a page-specific chat activation user-interface (UI) element; and receiving a selection of the page-specific chat activation UI element, wherein the page-specific chat interface is launched in response to receiving the selection.

3. The system of claim 2, further comprising:

surfacing a generic chat activation UI element;

receiving a selection of the generic chat activation UI element; and in response to receiving the selection of the generic chat activation UI element, replacing the page-specific chat interface with a generic chat interface.

4. The system of claim 1, wherein the page-specific chat interface includes at least one of a chat title or a chat icon that is specified in the custom AI metadata.

5. The system of claim 1, wherein content for the webpage is surfaced in a main window of the web browser, and the page-specific chat interface is concurrently surfaced in a side pane of the web browser.

6. The system of claim 1, wherein the custom AI metadata includes structure data for executing a query against at least one of the webpage or a website to which the webpage belongs.

7. The system of claim 6, wherein the structure data includes a structured uniform resource locator (URL) including query terms.

8. The system of claim 1, wherein the custom AI metadata includes structure data for semantic parsing of the webpage.

9. The system of claim 1, wherein the custom AI metadata includes one or more tasks that are capable of being completed by at least one of the webpage or a website to which the webpage belongs.

10. The system of claim 9, wherein one or more of the tasks further includes a web address for completing the tasks.

11. The system of claim 9, wherein one or more of the tasks further includes a sequence of actions to be performed to complete the tasks.

12. The system of claim 11, wherein the output payload includes at least one web browser command for completing an action in the sequence of actions.

13. The system of claim 12, wherein the web browser command is one of a navigation command or a form-filling command.

14. The system of claim 1, wherein the custom AI metadata includes subject-matter domain data for the webpage.

15. The system of claim 1, wherein parsing the web data package includes identifying a unique tag within HyperText Markup Language (HTML) that identifies the custom AI metadata.

16. A system for implementing custom web transformers, comprising:

at least one processor; and memory storing instructions that, when executed by the at least one processor, cause the system to perform operations comprising:

surfacing, in a toolbar of a web browser, a generic chat activation user-interface (UI) element for launching a generic chat interface that comprises a first input field;

receiving a selection of the generic chat activation UI element;

in response to the selection of the generic chat activation UI element, launching the generic chat interface;

receiving, by the web browser from a web server, a web data package for a webpage, wherein the web data package includes a markup language for the webpage that specifies how the webpage is displayed in the web browser and further includes custom artificial intelligence (AI) metadata;

parsing the web data package to extract the custom AI metadata from the web data package; and based on a presence of the custom AI metadata, replacing the generic chat interface with a page-specific chat interface, wherein the page-specific chat interface includes one or more UI elements specified in the custom AI metadata.

17. The system of claim 15, wherein the operations further comprise:

receiving, in the page-specific chat interface, an input query;

generating a prompt including the custom AI metadata and the input query;

providing the prompt to a language model;

receiving, in response to the prompt, an output payload from the language model including a response to the input query; and surfacing, in the page-specific chat interface, the response.

18. The system of claim 16, wherein the custom AI metadata specifies at least one of a chat title or a chat icon for the page-specific chat interface.

19. A computer-implemented method for implementing custom web transformers, the method comprising:

receiving, by a web browser from a web server, a web data package for a webpage, wherein the web data package includes a markup language for the webpage that specifies how the webpage is displayed in the web browser and further includes custom artificial intelligence (AI) metadata;

parsing the web data package to extract the custom AI metadata from the web data package;

launching a page-specific chat interface based on the custom AI metadata concurrently with a display of at least a portion of the webpage;

receiving, in the page-specific chat interface, an input query;

generating a prompt including the custom AI metadata and the input query;

providing the prompt to a language model;

receiving, in response to the prompt, an output payload from the language model, the output payload including a response to the input query and a web browser command;

surfacing, in the page-specific chat interface, the response in the output payload; and executing the web browser command.

20. The computer-implemented method of claim 19, wherein the web browser command is one of a navigation command or a form filling command.

* * * * *